Feb. 15, 1938.     J. D. CHRISTIAN     2,108,368
SPEED CHANGE DEVICE
Filed Nov. 28, 1936     2 Sheets-Sheet 1
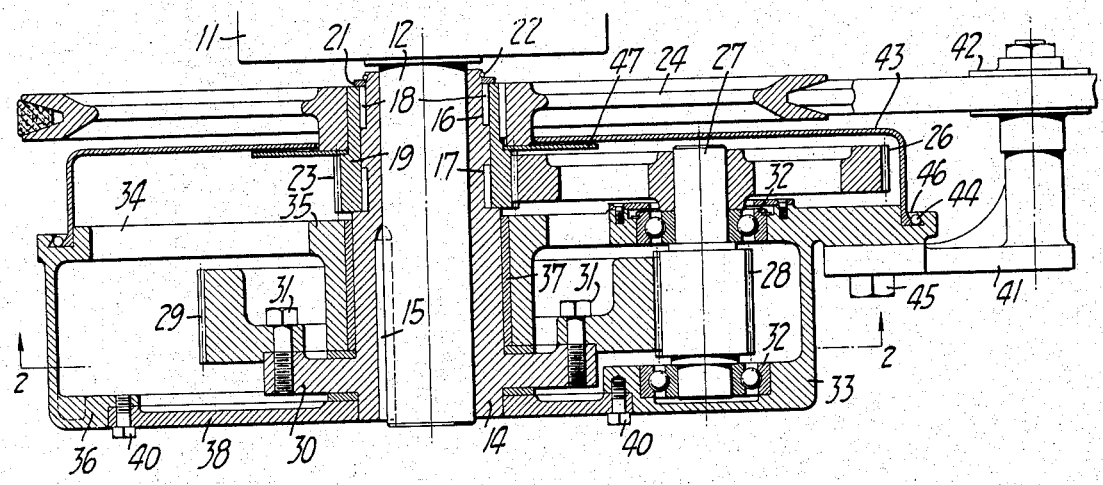
FIG_1_
FIG_2_
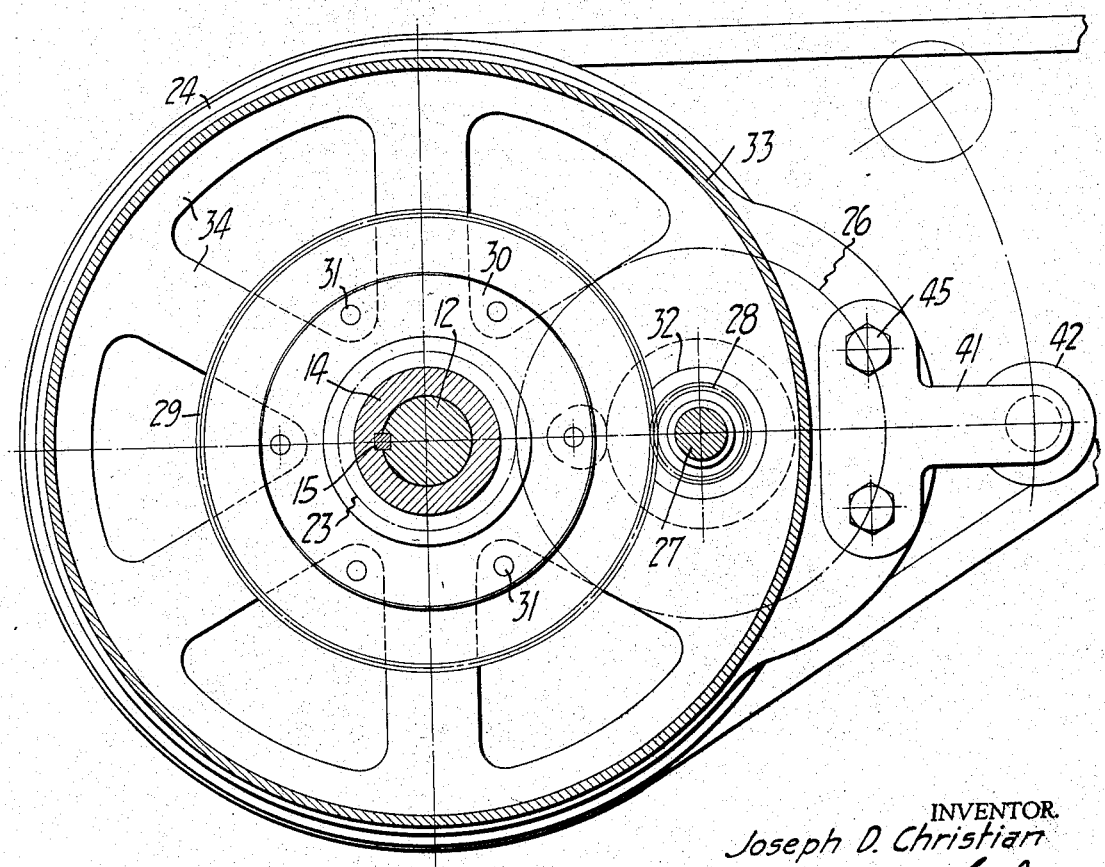
INVENTOR.
Joseph D. Christian
BY
Robert H. Eckhoff
ATTORNEY.

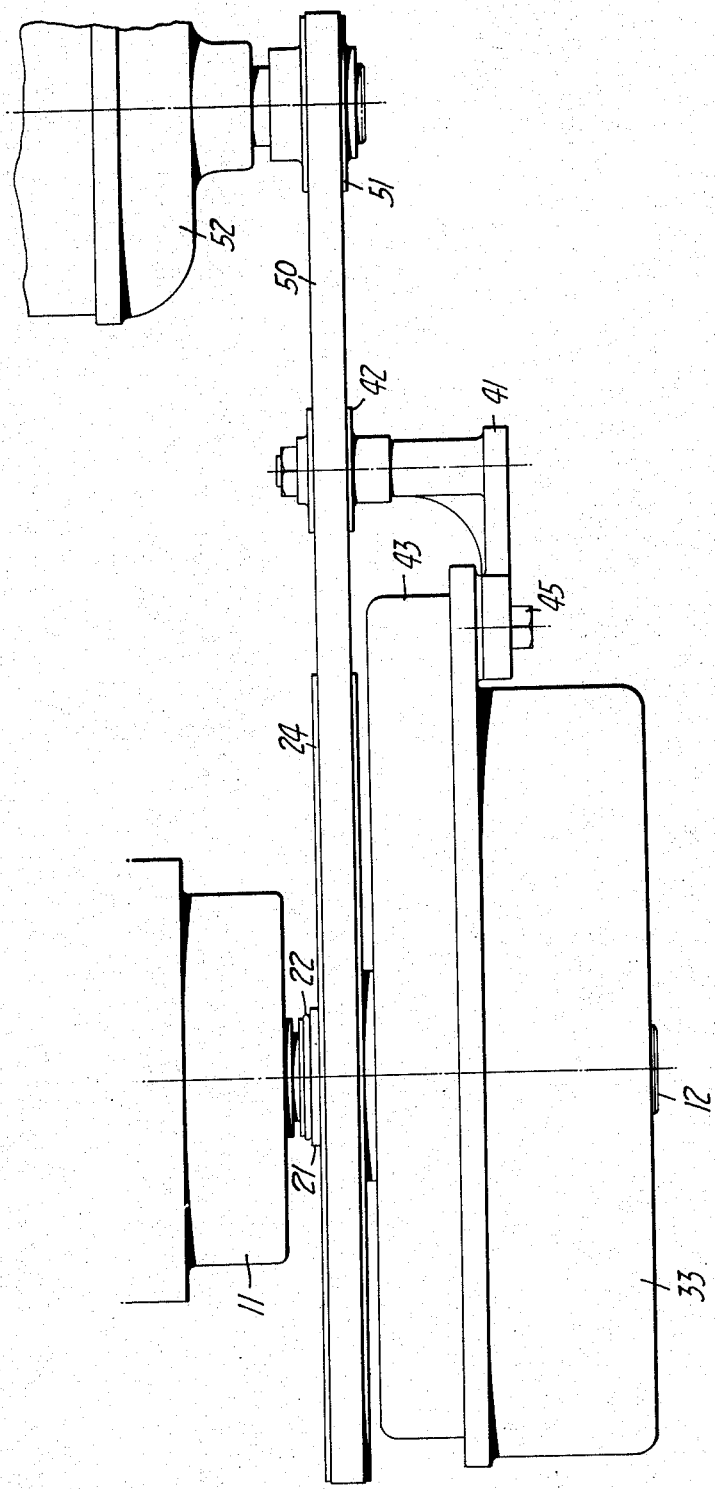

Patented Feb. 15, 1938

2,108,368

UNITED STATES PATENT OFFICE 2,108,368

SPEED CHANGE DEVICE

Joseph D. Christian, San Francisco, Calif.

Application November 28, 1936, Serial No. 113,247

3 Claims. (Cl. 74—242.11)

This invention relates to a speed change device.

In my prior Patent No. 1,860,703, issued May 31, 1932, I have disclosed a construction of an electric power unit in which an electric motor is mounted upon and supported by a speed change unit, the motor and the speed change unit being mounted together upon a base provided only beneath the speed change unit. The device of this patent met with a recognized commercial success, and resulted in the advent of what is now known in the commercial art as "motorized speed reducers."

Because of the nature of the structure utilized, the cost of the unit of my aforesaid patent has been relatively high. This is necessarily so because, for example, to provide such a unit an electric motor is first purchased and reconstructed for the motor reception in the speed change unit, the motor shaft being bored or splined to receive a direct connection to a shaft in the speed reduction unit. This of course involves charges in procuring the customer's motor, taking down the motor, in either remachining its standard shaft or else making a new shaft, and in assembling the motor on the reduction unit.

A further objection to units of this type has been encountered in the lack of flexibility in effecting any speed change in a simple and inexpensive manner. With the motor directly coupled to a shaft in the speed reducing unit, a change in speed between the motor and the speed reduction unit was not possible. The only change that could be effected, so far as the unit itself was concerned, was to take the unit apart and change the gears therein. Since this required removal of the unit from the base upon which it was supported, and taking down of the entire unit, the cost was too high and this was rarely done. If it was attempted to secure a change of speed between the driven shaft and the speed reducing unit, as by providing a gear or sprocket and chain drive, it was necessary to provide elements of comparatively heavy construction and comparatively high cost, because of the low speed of operation.

The device of the present invention obviates all of the previously discussed difficulties. It enables a standard motor to be used without changing anything on the motor, without requiring any special machining or other fitting on the motor. It also enables a speed change to be secured between the motor and the speed reducing unit, a simple and inexpensive chain, a flat belt or V belt being utilized for this.

To effect a change in speed, it is only necessary to change the sprockets or pulleys, a matter of a few moment's work, since nothing need be removed from a base or taken out of alignment. If a V belt or flat belt drive is employed, shock absorbing means are provided which will absorb much of the shock of the suddenly applied load. This feature is one of considerable value, inasmuch as some difficulty was encountered in the previous units of my patent, it being necessary to provide a relatively rugged base and casing structure for the speed change unit, as well as gearing and other internal construction of high service factors, to take the abuse.

It is an object of the present invention to provide an improved and simplified speed change unit construction.

Another object of the present invention is to provide a device in which the speed change unit is carried directly by the device to be driven. Thus, in accordance with this invention, if a pump, mill or other unit is to be driven the speed change unit is mounted directly upon the power intake shaft of the pump, mill or other unit.

Another object of the present invention is to provide a novel pinion gear and bearing construction therefor.

Another object of the present invention is to provide a novel pinion gear, sprocket or pulley mounting, and bearing support therefor.

Another object of the present invention is to provide a novel shock absorbing means in a speed change unit.

The invention includes other features and objects of advantage, some of which, together with the foregoing, will appear hereinafter, wherein present preferred structures embodying the present invention are disclosed.

In the drawings accompanying and forming a part hereof:

Figure 1 is a plan view, partly in section.

Figure 2 is a side elevation, partly in section, illustrating a structure embodying the present invention.

Figure 3 is a plan view, showing the unit of the present invention in combination with a suitable prime mover.

The unit of this invention is intended for use with a prime mover such as motor 52 to supply power to the element to be driven. This prime mover carries a suitable driving element 51 as a gear, sprocket, flat pulley, or a V belt pulley. The power receiving unit indicated generally at 11 includes an element 12 which is to be rotated at a speed usually considerably less than that of the prime mover. In this case, I have shown element 12 as a shaft, but it can be a wheel or other structure to be rotated.

In accordance with this invention, I mount the speed change unit utilized to effect a major portion of the speed change directly upon the element 12. In the present instance, as appears in the drawings, I have shown a hub 14 as mounted upon shaft 12, which is of course supported by suitable bearing means in the unit 11. The hub 14 is suitably fixed to the shaft 12 to drive the same, as through a keyway 15. The shaft 12 is illustrative of rotatable means to be driven.

In accordance with this invention, means are provided for rotating the hub 14. Thus, at one end of the hub I form bearing races indicated by numerals 16 and 17. A single bearing race can be used if desired, but I prefer to use two of them and to provide a relatively wide supporting surface. In the bearing race are positioned rollers 18, although balls can be used if desired, if the total pressure upon the bearing is not particularly great.

Mounted directly upon and rotating on the rollers is an annular member 19. Rollers between the annulus 19 and the hub 14 are retained in place by washer 21 and spring locking ring 22.

It is a feature of this invention that the annular member is utilized as a driving element for the hub, as well as part of a roller bearing. Thus, upon a portion of its outer surface is formed gear teeth 23, so that the annular member can be used directly as a pinion gear. By providing the bearing means directly between the annular member and the hub, the diameter of the gear 23 can be reduced to a minimum, closely approximating that of shaft 12, so that considerable reduction can be effected between gear 23 and the gear which it drives. Another portion of the annular member 19 is utilized for reception of a suitable driving element, as pulley 24.

Means are provided between gear 23 and the hub 14 which will effect a reduction in speed. A gear 26 is mounted upon a countershaft 27 and is driven thereby, so that upon rotation of pinion gear 23, gear 26 is rotated and shaft 27 is driven thereby.

Rotation of shaft 27 is effective to rotate gear 28 formed upon shaft 27, which gear is enmeshed with a ring gear 29. Ring gear 29 is attached by cap screws 31 to a flange 30 formed upon the hub, so that, in accordance with this invention, rotation of the gear 23 is effective to rotate the hub and its supporting shaft 12, the power input shaft.

The countershaft 27 is supported by ball bearings 32, which are in turn mounted in a frame structure indicated generally by numeral 33. The frame structure includes opposite members 34 and 36 journalled upon the hub by a flange 35 supported by bearing means 37. The frame structure is usually a casting, providing a rigid support structure for the countershaft 27. A removable plate 38 secured by cap screws 40 is provided for assembly.

Instead of the simple single gear reduction unit disclosed, further reduction can be effected, if desired, by including additional gearing, while in place of gearing to effect the reduction, chains and sprockets can be employed or V belt pulleys. The terms "gear and gearing" used herein and in the claims are to be read as including these obvious equivalent constructions.

In accordance with this invention, means are provided for cushioning the sudden load shock present in the device and to absorb reverse torque load from member 34. In accordance with my present preference, this is cared for by providing an extension on frame member 33, numeral 41 indicating such an extension secured by cap screws 45.

It is of course necessary to resist the rotation of extension 41 if the unit is to be effective as a driving means for shaft 12, for if this shaft were held and power was applied from the motor 52, the frame 33 would rotate if it was not restrained as by engaging extension 41.

In accordance with this invention, I provide extension 41 with an element such as wheel 42 which bears upon the flexible driving element 50, the V belt, chain, etc. and keeps a tension thereon, the length of the extension being varied to suit the pressure desired upon the input power element.

The whole unit is encased in a suitable removable casing structure 43, the frame serving as a portion thereof. The casing 43 is shown as a light sheet metal casing held by ring 44 in groove 46 on the frame. A plate 47 on the member 14 prevents oil leakage.

By varying the relative sizes of the driving element 24, and that on the prime mover, as by substituting other sprockets or pulleys, fundamental changes in the speed can be quickly made without disrupting alignment of any of the units.

The unit disclosed is applicable quickly and inexpensively to a wide variety of power utilizing units. For example, hub 14 need only be bored out or otherwise fashioned for mounting upon the shaft or for attachment to the element which it is to drive. Nothing need be done to the motor shaft, and, as a consequence, the second hand value of the motor is not depreciated.

Since in the main, speed changes can be readily made by changing the driving element 24 and that on the prime mover, the unit is readily adapted to a wide variety of speeds at very low cost. These elements are on the high speed end, and standard parts ordinarily kept in stock can be employed, these elements being far less expensive than elements usually employed, of a special nature necessarily, when applied to the low speed side of the unit.

By mounting the pinion gear driving element structure directly upon the hub, and by providing the bearing between the gear and the support shaft, I have found that the bearing load is so reduced that it is possible to make the hub 14 and the annular member 19 of metal of low hardness. The ring gear 29 can be made cheaply and easily in the form of a forging, and attached to the flange 30 on the hub easily and quickly. This reduces costs very materially.

From the foregoing it is believed to be readily apparent that I have provided a novel structure relatively simple in construction, and of much less cost to manufacture than that disclosed in the aforementioned patent. At the same time, I have provided a unit which is relatively of greater utility, for it is far more flexible so far as the variations in speed are concerned which it enables to be secured.

It is to be noted that the present unit requires little space, much less than that of previous drives, so it can be installed on units with much less trouble. Its installation cost is lower for the customer's motor need not be transported, reconstructed and returned by the manufacturer.

Further, it provides a speed change unit which utilizes the standard belts, pulleys, chains and sprockets, and makes these of increased utility, whereas present speed reducers take no advantage of them.

I claim:

1. In combination, a driven device including a power intake element, a hub secured to said element for rotating said element, a first gear secured to said hub, a second gear rotatable on said hub, a frame journalled on said hub, means for resisting rotation of said frame, gear means carried by said frame and joining said first gear to said second gear for driving, a motor including a drive shaft, a driving element thereon, a driven element for said second gear, and a continuous flexible drive means trained about said driving and driven elements, said resisting means including an element supported by said frame and engaging said flexible drive means at least upon rotation of said hub in one direction.

2. In combination, a driven device including a power intake element, a hub secured to said element for rotating said element, a first gear secured to said hub, a frame journalled on said hub, means for resisting rotation of said frame, a second gear, means supporting said second gear for rotation with respect to said frame, a driven element for said second gear, said driven element being outside said frame, gear means carried by said frame and joining said first gear to said second gear for driving, a motor including a drive shaft, a driving element thereon, and a continuous flexible drive means trained about said driving and driven elements, said resisting means including an element supported by said frame and engaging said flexible drive means at least upon rotation of said hub in one direction.

3. In combination, a driven device including a power intake element, a hub secured to said element for rotating said element, a first gear secured to said hub, a frame journalled on said hub, a second gear, means supporting said second gear for rotation with respect to said frame, a driven element for said second gear, said driven element being outside said frame, gear means carried by said frame and joining said first gear to said second gear for driving, a motor including a drive shaft, a driving element thereon, and a continuous flexible drive means trained about said driving and driven elements, and means extending from said frame toward said motor for increasing tension on said flexible drive means to resist effectively rotation of said frame.

JOSEPH D. CHRISTIAN.